United States Patent Office 2,862,355
Patented Dec. 2, 1958

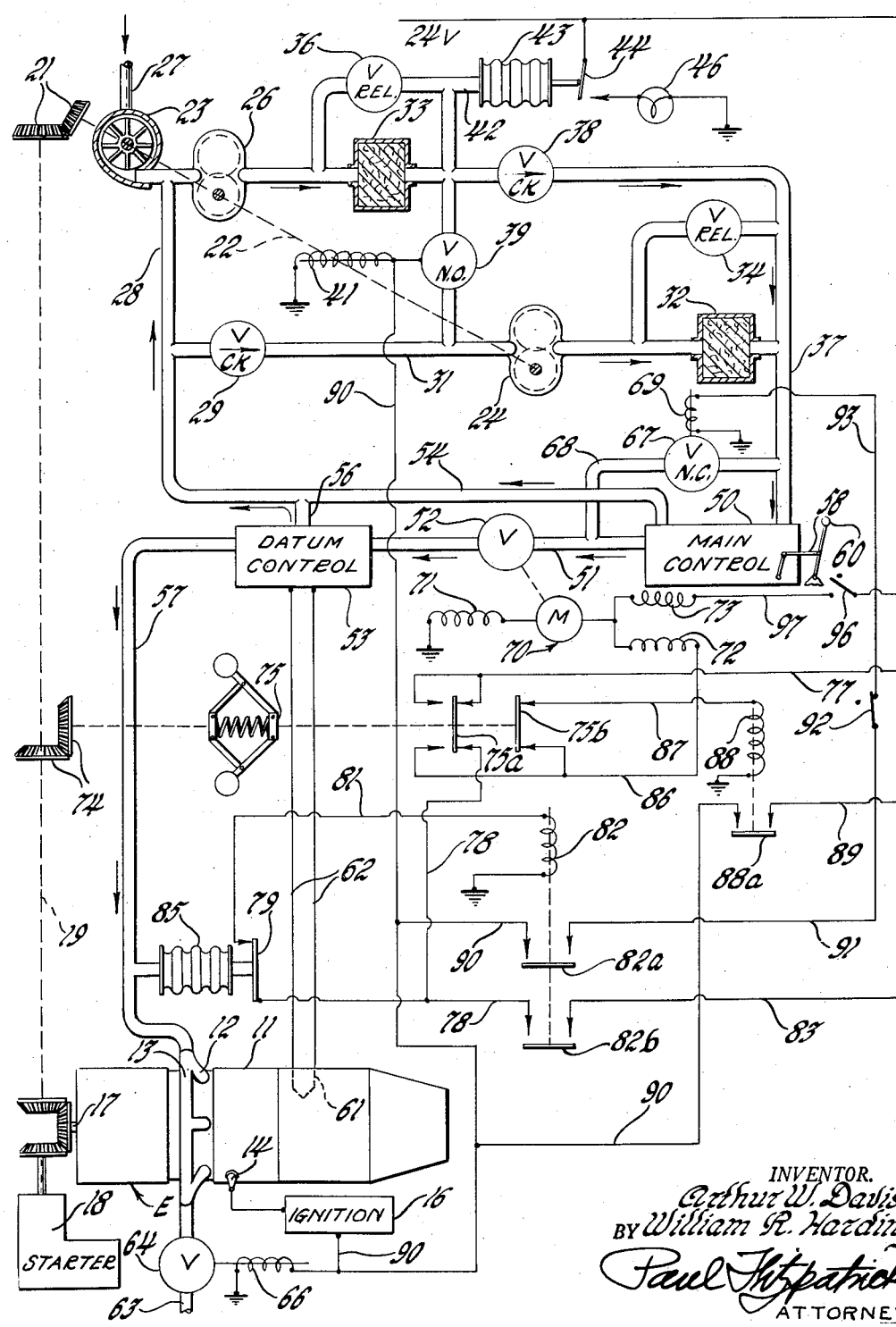

2,862,355

TURBINE STARTING FUEL SYSTEM

Arthur W. Davis, Brownsburg, and William R. Harding, Indianapolis, Ind., assignors to General Motors Corporation, Detroit, Mich., a corporation of Delaware Application May 26, 1955, Serial No. 511,256

1 Claim. (Cl. 60—39.14)

This invention relates primarily to fuel systems for gas turbine engines. The principal aspect of the invention is an arrangement for increasing the rate of fuel flow to the engine briefly when it is started to secure effective atomization of fuel and quick and sure ignition.

In its preferred embodiment described herein the invention is applied to a fuel system which comprises engine driven fuel pumps and a main fuel control device which meters the fuel supplied to the engine. The fuel is injected into the combustion chambers of the engine through spray nozzles which require a characteristic minimum fuel flow rate for satisfactory atomization.

As the engine is cranked for starting, fuel is supplied to the engine and an electric spark igniter is energized to initiate combustion. This occurs at a low engine speed at which the scheduled fuel flow metered by the main fuel control is not great enough to provide adequate atomization of the fuel by the fuel spray nozzles for prompt ignition of the fuel. Under these circumstances, the initial spray from the nozzles may be poorly atomized and difficult to ignite and when the pressure in the nozzles has built up enough to give good atomization and the fuel does ignite, a hot start may result from burning of the fuel already sprayed into the combustion apparatus.

In the preferred embodiment of the invention, this starting difficulty is obviated by the provision of a by-pass for the main control which is opened temporarily at the beginning of the starting cycle so that all of the pump discharge is supplied to the nozzles. The by-pass is opened automatically at the beginning of the starting cycle and is closed as soon as the engine is receiving an adequate supply of fuel as evidenced by a measurement of the fuel pressure in the engine fuel manifold.

The principal object of the invention is to improve the starting characteristics of a gas turbine engine. The nature thereof will be more fully apparent from the succeeding detailed description of a fuel system embodying the invention and the accompanying drawing, which is a schematic diagram of the fuel supply system.

The fuel system supplies a gas turbine engine E, the internal structure of which is not illustrated, and which may include a combustion apparatus 11 into which fuel is sprayed through fuel nozzles of suitable type, not illustrated, each fuel nozzle being supplied through a branch conduit 12 from a fuel line or fuel manifold 13. Upon starting the engine, combustion is initiated by an igniter or spark plug 14 energized by an ignition generator 16. The engine may include a shaft 17 coupled through suitable gearing to a cranking device such as the starter 18 of any suitable type. The engine also drives the schematically indicated shaft 19 coupled through gearing 21 to the schematically indicated pump drive shaft 22. Mounted on or driven by shaft 22 are a centrifugal booster or priming pump 23, a main positive displacement fuel pump 24, preferably a gear pump, and an auxiliary fuel pump 26 of the same type as the main pump. Main pump 24 is of slightly larger capacity than pump 26. Fuel is supplied from any suitable source through a pipe 27 to the priming pump 23 which discharges it into a line 28 connected to the inlet of pump 26 and to a check valve 29 through which fuel flows into a line 31 communicating with the inlet of the main pump 24. Pumps 24 and 26 discharge through filters 32 and 33, respectively, which are by-passed by relief valves 34 and 36, respectively, to permit passage of fuel in the event of blockage of the filter. The outlet of filter 32 is connected directly to a fuel delivery line 37 and the outlet of pump 26 is connected to line 37 through a check valve 38. A valve 39 of a normally open type is connected between the discharge of auxiliary pump filter 33 and the intake line 31 of the main pump. This valve may be held closed by energizing solenoid 41 and opens when the solenoid is deenergized.

In normal operation of the engine, valve 39 is open and pump 24 satisfies the fuel requirements of the engine. Since main pump 24 has a slightly greater capacity than pump 26, it takes the entire output of pump 26 and draws additional fuel through check valve 29. With check valve 29 open, auxiliary pump 26 runs unloaded and check valve 38 is held closed by the pressure developed by pump 24. If pump 24 should fail completely or partially so that its displacement is less than that of pump 26, pump 26 develops pressure, closing check valve 29 and opening check valve 38, and the auxiliary pump then supplies the engine. Under these conditions, there is substantial pressure in the discharge of pump 26, which communicates through line 42 with a pressure responsive device such as a bellows 43 which closes a normally open switch 44 to energize a signal light 46 from a twenty-four volt bus. Energization of this light is an indication that the auxiliary pump is working and, therefore, that the main pump is not functioning properly.

By energizing solenoid 41 and thus closing valve 39, the two pumps are put in parallel and the full discharge of both pumps is delivered to fuel line 37.

The fuel nozzles in this installation are of the non-return type, and the fuel supply to the engine is controlled by a fuel controlling system responsive to a power setting determined by the engine power control lever and responsive to such factors as engine speed and ambient conditions to deliver the required amount of fuel to the engine and protect the engine against overtemperature, overspeed conditions, flame-out, and surging conditions. The fuel controlling system returns the excess delivery of the pumps to the inlet of the gear pumps. It may be of any suitable type. In the embodiment of the invention illustrated herein, it is applied to a fuel system of the type described in the co-pending application of Boyer et al., Serial No. 496,094, filed March 23, 1955, of common ownership with this application. In that system, fuel is metered by a main control 50 supplied by pump discharge line 37. The main control discharges metered fuel through a conduit 51 and fuel shutoff valve 52 to a temperature datum fuel control 53. The excess of pumped fuel over the metered quantity delivered to line 51 is returned to pump inlet line 28 through a fuel return line 54 by a valve in the fuel control opened in response to pressure drop across a variable metering orifice in the fuel control as is common practice. The temperature datum control corrects the metered quantity of fuel by returning more or less of the metered fuel to the return line through a branch return line 56. The remainder, which is the corrected fuel supplied to the engine, is fed through conduit 57 to the fuel manifold 13 of the engine. The main control may be connected by any suitable means, indicated as linkage 58, to a power control lever 60 by which the operation of the engine is controlled by the pilot or engineer. The temperature datum control responds to temperature in the engine, this being indicated by a thermocouple junction 61 connected to the datum control through leads 62. It is to be understood that the presence of the datum control is not necessary to the invention and that the details of both the main control and the datum control are quite immaterial to the invention and, therefore, are not enlarged upon.

In order to empty the fuel manifold when the engine is shut down, it is provided with a drain line 63 in which is provided a drip or drain valve 64 of known type which is held closed by pressure in the fuel manifold above a small value, such as several pounds per square inch gauge, and which, therefore, opens when the engine is shut down so that fuel in the manifold will be drained out and will not drip into the combustion apparatus. Valve 64 includes a solenoid 66 which is energized when the engine is started to hold the valve closed until the manifold pressure builds up sufficiently to keep it closed.

In starting the engine, the main control is by-passed briefly by opening a normally closed valve 67 in a by-pass conduit 68 connected between the pump discharge line 37 and the fuel shutoff valve 52. This valve is open only while the solenoid 69, which operates the valve, is energized.

The fuel shutoff valve 52 may be operated by an electric motor 70 including armature M, a brake coil 71, and field coils 72 and 73 which are selectively energized to operate the motor in one direction or another to open or close the valve.

The engine accessory drive shaft 19 is coupled through gearing indicated as 74 to a speed responsive device 75 which operates switches which perform control functions during the starting cycle of the engine. The details of this speed switch are immaterial to the invention, but it may be noted that it is preferably of the type disclosed in an application of Arthur W. Gaubatz, Serial No. 352,453, filed May 1, 1953, now Patent No. 2,786,667, of common ownership with this application.

The structures embodied in the fuel system according to the invention have now been described except for the electrical control circuits thereof, which perhaps may best be described in terms of the operation.

Before starting the engine, the twenty-four volt bus is energized, which provides a circuit from the bus through line 77, back contacts 75a of speed switch 75, line 78, normally closed pressure operated switch 79, line 81, and the solenoid of holding relay 82 to ground. The relay thus energized closes a circuit from the bus through line 83, front contacts 82b of the relay to line 78, by-passing back contacts 75a of the speed switch. Switch 79 is opened by a pressure responsive device such as bellows 85 connected to the fuel supply conduit 57 or fuel manifold 13 of the engine so that it responds to the pressure of fuel delivered to the fuel nozzles.

The starting of the engine is initiated with the fuel shutoff valve closed and the ignition generator out of operation by energizing the starter 18 to crank the engine. As the engine speed increases, it reaches a point at which initiation of combustion is feasible, which, in a particular case, is about one-sixth normal engine operating speed. At this speed, speed responsive device 75 closes front contact 75a and opens back contact 75a. Relay 82 remains energized through its holding contact 82b and pressure switch 79. Front contacts 75a energize line 86 which is connected through field coil 72, armature M and brake coil 71 of shutoff valve operating motor 70 which is thereby caused to open the valve. Back contacts 75b of speed switch 75 remain closed and provide an energizing circuit from line 86 through line 87 and the solenoid of ignition relay 88 to ground.

The ignition relay closes a circuit from the twenty-four volt bus through line 89, front contact 88a of the relay, and line 90 to the solenoid 41 of normally open valve 39. Valve 39 is closed to cause main pump 24 and auxiliary pump 26 to operate in parallel, delivering the full displacement of both pumps into the pump outlet line 37. Line 90 also is connected to the ignition generator 16, energization of which provides high voltage excitation for the spark plug 14. Line 90 also energizes solenoid 66 which closes the manifold drain valve 64. Line 90 is connected through front contacts 82a of the holding relay, line 91, a manually operable cutout switch 92, and line 93 to starting fuel enrichment solenoid 69 which, when energized, opens the normally closed fuel control by-pass valve 67. Switch 92, normally closed, may be opened to disable the starting fuel enrichment solenoid 69.

Summarizing, it will be seen that, at about one-sixth rated engine speed, valve 39 is closed to put the pumps in parallel, valve 67 is opened to by-pass the main fuel control, valve 52 is opened to admit the fuel to the engine manifold, drain valve 64 is closed, and the ignition is energized. At this time, therefore, maximum pump capacity is available without any reduction by the main fuel control to provide immediate injection of fuel into the engine by the spark plug 14. The by-pass valve in the main fuel control closes because there is no pressure drop across the main control. If the datum control is present, it will by-pass a certain portion of the fuel. If the datum control is omitted, the entire output of the pumps is supplied to the fuel manifold. Effective atomization and immediate combustion will result. It is not necessary to maintain the excess fuel delivery for any length of time, since it is merely a means to fill up the fuel lines promptly and insure quick lighting of the burners. For this reason, the main control by-pass 68 should be closed soon after the initiation of fuel supply to the engine. This may be accomplished in various ways, but in the preferred embodiment of the invention it is effected by pressure switch 85 which may be adjusted to open when fuel manifold pressure reaches a value, say, of 110 pounds per square inch gauge, ample to provide good atomization. When pressure switch 79 opens, the holding circuit for holding relay 82 is broken, deenergizing this relay and thereby breaking the energizing circuit of the main control by-pass valve solenoid at front contacts 82a. Valve 67 closes, putting the main control in normal operation. In a particular installation, valve 67 normally remains open less than five seconds.

Continuing with the starting cycle of the engine, after combustion is initiated, the engine continues to accelerate, with the assistance of the starter until the starter is cut out, and thereafter under its own power. At a self-sustaining speed of the engine, which may be about two-thirds normal rated speed, the speed responsive device 75 opens its back contacts 75b, deenergizing the ignition relay 88. Lead 90 is thus deenergized at contacts 88a, deenergizing solenoid 41 to open valve 39, cutting off the ignition, and deenergizing the drip valve solenoid 66. The drip valve remains closed under manifold pressure. Opening valve 39 restores the fuel pump system to operation with the main pump 24 supplying the load and auxiliary pump 26 running idle.

It may be noted that if the fuel pressure drops so as to permit pressure switch 79 to reclose after by-pass valve 67 has been closed, this valve will not reopen, since its energizing circuit is broken by relay 82 which cannot be energized until the engine speed drops below one-sixth rated speed so that back contacts 75a of speed switch close.

To summarize the operation of the fuel pumping and control system during starting: at the beginning of cranking pump 24 is operative and pump 26 is inoperative. Cutoff valve 52 is closed so no fuel can reach the engine. At one-sixth rated speed, the fuel pumps are put in parallel operation, the main control is by-passed, the shutoff valve is opened, the drip valve is closed, and the ignition is turned on. When fuel mainfold pressure reaches the predetermined value, the main control by-pass is closed so that the engine fuel supply is regulated according to the schedule of the main control. At two-thirds engine speed the ignition is turned off, the drip valve solenoid is deenergized, and the auxiliary pump is cut out of operation. The fuel system may then operate normally until the engine is shut down.

Whenever the engine is shut down, the fuel shutoff valve is closed. This may be effected by energizing field coil 73 of the motor from the twenty-four volt bus through a normally open switch 96 and line 97 so that the valve will close and remain so until the engine is started for the next cycle of operation.

It should be pointed out that the engine E may be a power turbine driving a power output shaft, a jet propulsion engine, or a gas turbine engine of any other type. It will be noted that, as a matter of physical structure, valve 52 may be and preferably is incorporated in the main fuel control 50.

It will be apparent that a valve closing the by-pass return line 54 could be used in place of the main fuel control by-pass line 68 and valve 67. Such a valve could be located in the by-pass downstream from the main control only, or downstream from the main and temperature datum controls. In the latter case, it would eliminate any by-passing by the temperature datum control while the starting fuel enrichment feature is operative. A normally open solenoid closed valve in line 54 could be energized by line 93 of the figure just as valve solenoid 69 is energized as shown. However, the arrangement illustrated is preferred for reasons of safety and simplicity. If a valve closing by-pass line 54 is used, it would need to be of a relief valve type or be paralleled by a relief valve to eliminate the possibility of destructive pressure build-up in the main fuel control.

The advantages of the invention in providing maximum flow of fuel for quick and certain lightoff of all of the fuel burning nozzles of an engine will be apparent to those skilled in the art.

The detailed description of the invention for the purpose of explaining the principles thereof is not to be construed as limiting the invention, as many modifications may be made by the exercise of skill in the art without departing from the principles of the invention.

We claim:

A fuel supply system for a gas turbine engine comprising, in combination, positive-displacement fuel pumping means coupled to the engine to be driven thereby, the pumping means comprising a normally operative pump, a normally inoperative pump, and means to render both pumps operative; fuel controlling means supplied by the pumping means; an engine fuel conduit supplied by the controlling means; a fuel shutoff valve intermediate the pumping means and the fuel conduit; valve operating means for the shutoff valve; a by-pass conduit connecting the pumping means with the shutoff valve and by-passing the fuel controlling means; a normally closed by-pass valve in the by-pass conduit; opening means for the by-pass valve; ignition means for the engine; first means responsive to engine speed operable at a cranking speed of the engine, the first speed responsive means being coupled to the means to render both pumps operative, the shutoff valve operating means, the by-pass valve opening means, and the ignition means so as to render both pumps operative, open the fuel shutoff valve, open the by-pass conduit, and energize the ignition when the engine reaches a predetermined cranking speed; means responsive to pressure in the fuel conduit coupled to the by-pass valve opening means to close the by-pass when the fuel pressure attains a predetermined value; and second means responsive to engine speed operable at a running speed thereof, the second speed responsive means being coupled to the means to render both pumps operative so as to deactivate the normally inoperative pump and to the ignition means so as to deenergize the ignition means.

References Cited in the file of this patent

UNITED STATES PATENTS

| | | |
|---|---|---|
| 2,626,655 | Trautman et al. | Jan. 27, 1953 |
| 2,667,742 | Kuzmitz | Feb. 2, 1954 |
| 2,699,218 | Nims | Jan. 11, 1955 |
| 2,730,862 | Lamy | Jan. 17, 1956 |